United States Patent [19]

Garms

[11] Patent Number: 4,911,203
[45] Date of Patent: Mar. 27, 1990

[54] FUEL LINE CONNECTOR
[75] Inventor: John F. Garms, Menasha, Wis.
[73] Assignee: Brunswick Corporation, Skokie, Ill.
[21] Appl. No.: 399,371
[22] Filed: Aug. 24, 1989

Related U.S. Application Data

[63] Continuation of Ser. No. 186,185, Apr. 26, 1988, abandoned.

[51] Int. Cl.$^4$ .............................................. F16L 29/00
[52] U.S. Cl. ............................. 137/614.04; 251/149.6
[58] Field of Search .............. 137/614, 614.04, 614.05; 251/149.6

[56] References Cited

U.S. PATENT DOCUMENTS 3,174,508  3/1965  Zahuranec ..................... 137/614,04
3,800,826  4/1974  McCann ........................ 137/614.05 X
3,873,062  3/1975  Johnson et al. .................. 251/149.6
4,378,028  3/1983  Weber et al. ................... 137/614.05

OTHER PUBLICATIONS

Snap-Tite catalog, 7/1968, Union City, Pa. 16438.

Primary Examiner—John Fox
Attorney, Agent, or Firm—Andrus, Sceales, Starke & Sawall

[57] ABSTRACT

A coupling assembly for connecting conduits conveying fuel under pressure, utilizes a pair of seals so as to define a chamber for the containment of excess pressurized fuel during the disengagement of the coupling members. A protective shield or flange is provided around the locking mechanism so as to prevent inadvertent contact with the release mechanism and accidential disengagement of the coupling members.

3 Claims, 1 Drawing Sheet

U.S. Patent    Mar. 27, 1990    4,911,203
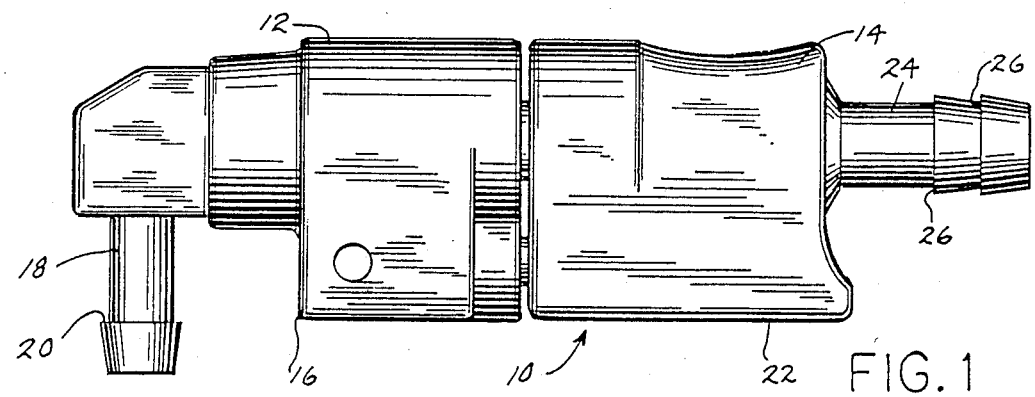
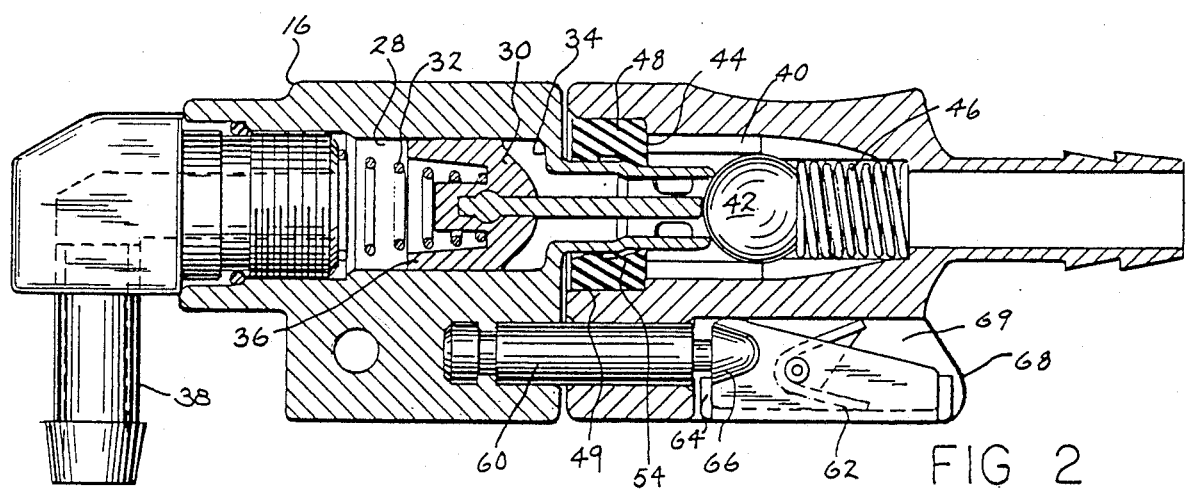
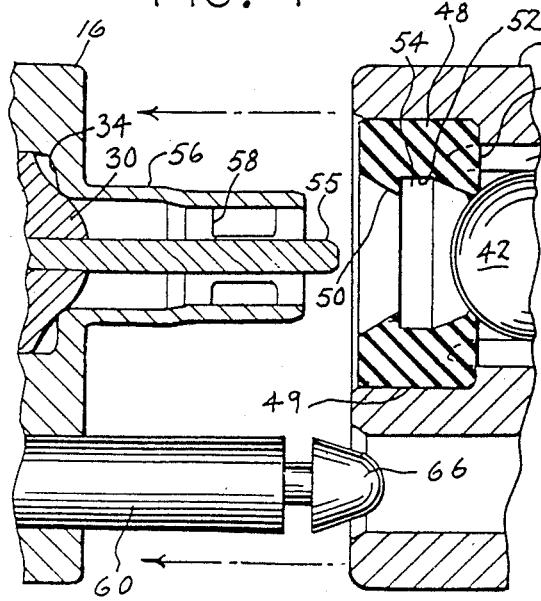
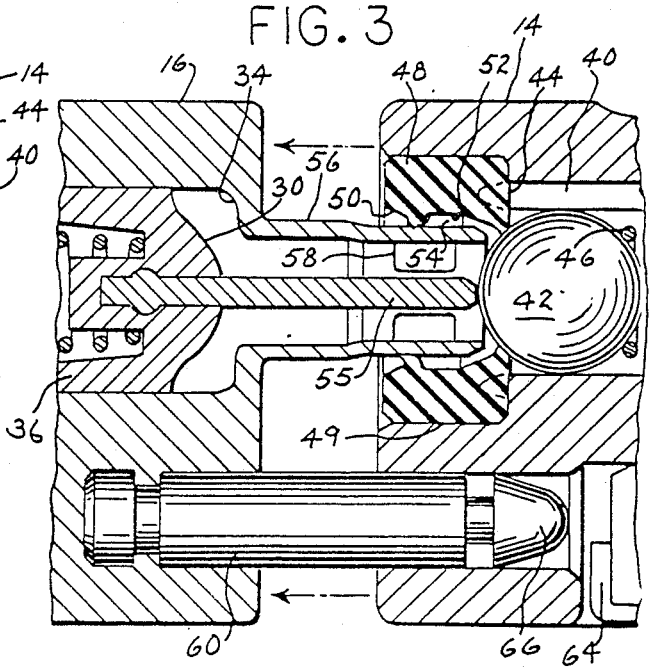

FUEL LINE CONNECTOR

This is a continuation of co-pending application Ser. No. 07/186,185 filed Apr. 26, 1988, now abandoned.

BACKGROUND OF THE INVENTION

The present invention relates to a quick connect and disconnect coupling assembly and more particularly to a coupling for connecting the line from a fuel tank to the line conveying fuel to an internal combustion engine.

Quick disconnect fuel line assemblies are well known in the marine art as is shown in U.S. Pat. No. 4,327,770.

Fuel line disconnect systems such as that shown in the '770 patent, utilize a pair of coupling members, each of which contains a spring biased valve member that seats itself upon a seal when the members are disconnected so as to prevent fuel leakage. However, since the fuel is typically pressurized, it is not uncommon for the disengagement of the coupling members to result in a spray of fuel caused by the momentary escape of fuel prior to the seating of the valve.

It is a purpose of the present invention to provide a quick disconnect fuel line coupling that eliminates the disconnect fuel spray.

It is also a purpose of the present invention to provide a quick disconnect coupling in which the release for the locking means is protected from incidental contact so as to prevent any unintentional unlocking of the coupling members.

SUMMARY OF THE INVENTION

A coupling for connecting conduits conveying fuel under pressure includes first and second coupling members having fluid flow passages for conveying fuel from a fuel tank to an internal combustion engine.

In accordance with one aspect of the invention, one of the coupling members is provided with a pair of spaced annual seals which cooperate with the bodies of the coupling members to define a chamber for containing fuel spray upon the disengagement of the coupling members.

In accordance with yet another aspect of the invention, one of the coupling members is provided with a shield that protects the lock release from incidental contact so that the coupling members cannot be accidentally or inadvertently disengaged during use.

BRIEF DESCRIPTION OF THE DRAWINGS

The drawings illustrate the best mode presently contemplated of carrying out the invention.

In the drawings:

FIG. 1 is a side view of a quick disconnect fuel line coupling with the two coupling members engaged;

FIG. 2 is a side cross sectional view of the quick disconnect assembly of FIG. 1;

FIG. 3 is an enlarged side cross sectional view showing the coupling members in a state of partial disengagement; and FIG. 4 is a side cross sectional view showing the coupling members in complete disengagement.

DESCRIPTION OF THE PREFERRED EMBODIMENT

As shown in FIGS. 1 and 2, a quick disconnect coupling assembly 10 includes a first coupling member 12 and a second coupling member 14. First coupling member 12 has a body 16 from which extends a cylindrical projection 18. Projection 18 includes a flange or barb 20 which facilitates the connection of projection 18 to a hose (not shown) which conveys fuel to an internal combustion engine.

Second coupling member 14 includes a second coupling body 22 having a cylindrical projection 24 which also contains barbs or flanges 26 which facilitate the coupling of projection 24 to a hose (not shown) which conveys fuel from a storage tank.

First coupling member 12 is provided with a fluid flow passage 28 in which valve member 30 is disposed. Valve member 30 is biased by spring 32 to a position in which valve member 30 is in engagement with valve seat 34 as shown in FIG. 4. When valve member 30 is unseated from valve seat 34 as shown in FIG. 2, fluid is allowed to flow around legs 36 of valve member 39 and into the passageway 38 of cylindrical projection 18.

Similarly, second coupling member 14 is provided with a fluid flow passage 40 and a valve member in the form of ball 42 which is urged into engagement with valve seat 44 by the action of spring 46. Thus, when coupling members 12 and 14 are not joined, their respective valve members 30 and 42 are in engagement with their respective valve seats 34 and 44 and fluid flow passages 28 and 40 are closed.

As best seen in FIGS. 3 and 4, an integral annular gasket 48 is press fit within a cavity 49 in second coupling body 22 and provides first seal 44 and a second seal 50 located downstream of first seal 44. First seal 44 also serves as a valve seat for ball 42. A recessed portion 52 in annular gasket 48 between first seal 44 and second seal 50 defines a chamber 54.

Valve member 30 is provided with a projection 55 that extends outwardly from coupling body 16 and comes into engagement with ball 42 when coupling members 12 and 14 are joined. Since spring 46 is stronger than spring 32, ball 42 will not yield to projection 55, but rather projection 55 will be forced back against yielding spring 32 and valve member 30 will become disengaged from valve seat 34 opening passageway 28.

Valve body 16 is also provided with a projection 56 that extends coaxially with valve projection 54 and which defines a fluid flow passage 58. When coupling members 12 and 14 are in engagement as shown in FIG. 2, the end of projection 56 engages ball 42 and forces it off valve seat 44 and fluid flow passage 58 provides communication between fluid flow passage 40 and fluid flow passage 28 so as to allow the flow of fuel from gas tank to engine. Also, in this coupled state, seals 44 and 50 engage projection 56 and provide a double seal.

As shown in FIG. 2, first coupling body 16 is provided with a projection 60 that extends through a recess in second coupling body 22 and engages a releasable locking lever 62 disposed on coupling body 22. When disengagement of the coupling members is desired, locking lever 62 is pressed to permit disengagement of flange 64 from locking nipple 66. Coupling body 22 is provided with a pair of spaced extending flanges or shields 68 which provide a channel 69 in which locking lever 62 is disposed so as to prevent incidental contact with locking lever 62 and the inadvertent or accidental disengagement of the locking mechanism.

As shown in FIG. 3, when disengagement of coupling members 12 and 14 is initiated, valve ball 42 returns to its valve seat 44 and cuts off the flow of fuel from fluid flow passage 40. However, prior to ball 42 returning to seat 44, a slight amount of pressurized fuel inevitably escapes from fluid passage 40. In the prior art, this pressurized fuel would result in a fuel spray upon complete disengagement of the coupling members. However, in the present invention, the excess fuel is contained within chamber 58 and its escape is prevented due to the interaction of body projection 56 with second seal 50. The contained fuel must then flow into fluid flow passage 58.

Upon complete disengagement, as shown in FIG. 4, all excess fuel has flowed into fluid flow passage 58 and fuel spray is eliminated.

It is recognized that various alternatives and modifications are possible in the scope of the appended claims.

I claim:

1. A coupling for connecting conduits conveying fuel under pressure comprising:

first and second coupling members having means for connection to associated fluid conduits and means for connection to each other, said first coupling member including a first body having therein a fluid flow passage and first valve means movable between a first position in which fluid flow through said passage is prevented and a second position in which flow is permitted and biasing means in said first body urging said first valve means into said first position, said second coupling member including a second body having therein a fluid passage, annular first inner seal means housed in said second body and extending radially inwardly into said second body fluid passage and second valve means engageable with said first seal means to prevent fluid flow with biasing means in said second body urging said second valve means into engagement with said first seal means and an annular second inner seal means housed in said second body and extending radially inwardly into said second body fluid passage and spaced downstream from said first inner seal means, said first body including a projection having a cross-section less than that of said second body fluid passage and extending from said first body and engageable with said first and second seal means when said coupling members are connected so as to provide a double seal along said projection and define a chamber radially outwardly of said projection between said first and second seal means, said projection having a passageway connecting said fluid flow passages of said coupling members when said members are joined to allow fluid flow between said coupling members, the engagement of said projection with said second valve means causing said second valve means to move out of engagement with said first seal means, said first body projection remaining in engagement with said annular second seal means upon initial disengagement of said coupling members as said second valve means engages said first seal means so as to confine pressurized fluid to said chamber and said fluid passage in said first body extension to prevent the discharge of excess pressurized fluid.

2. The coupling defined in claim 1 further comprising locking means to releasably maintain said coupling members in engagement and release means disposed on one of said coupling members to disengage said locking means, said coupling member having a pair of spaced extending flanges defining a channel in which said release means is disposed so as to prevent incidental contact with said release means and inadvertent disengagement of said locking means.

3. The coupling defined in claim 1 wherein said first and second inner seal means comprise an integral annular gasket press fit within said second body.

* * * * *